United States Patent [19]

Dickie et al.

[11] 4,398,167
[45] Aug. 9, 1983

[54] LIMITED ANGLE ELECTRIC ROTARY ACTUATOR

[75] Inventors: Hugh G. Dickie, Chandlers Ford; Anthony R. Hearn; John S. Heath, both of Winchester, all of England

[73] Assignee: International Business Machines Corporation, Armonk, N.Y.

[21] Appl. No.: 429,331

[22] Filed: Sep. 30, 1982

Related U.S. Application Data

[63] Continuation of Ser. No. 192,785, Sep. 29, 1980, abandoned.

[30] Foreign Application Priority Data

Dec. 28, 1979 [GB] United Kingdom ................ 7944530

[51] Int. Cl.$^3$ ............................................. H01F 7/08
[52] U.S. Cl. ................................... 335/272; 310/36; 310/266
[58] Field of Search .................................. 310/36–39, 310/266; 335/272–279, 230

[56] References Cited

U.S. PATENT DOCUMENTS

| | | | |
|---|---|---|---|
| 3,076,111 | 1/1963 | Burgwin | 310/266 |
| 3,089,044 | 5/1963 | Bolton | 310/36 |
| 3,118,076 | 1/1964 | Held | 310/39 |
| 3,121,851 | 2/1964 | Packard | 310/266 X |
| 3,152,275 | 10/1964 | Aske | 310/36 X |
| 4,019,075 | 4/1977 | Kagami | 310/260 |

FOREIGN PATENT DOCUMENTS 980487  4/1961  United Kingdom .
1342495  3/1971  United Kingdom .

OTHER PUBLICATIONS

J. S. Heath, "Design of a Swinging Arm Actuator for a Disk File", *IBM Journal of Research & Development*, Jul. 1976, pp. 389–397.
P. Y. Hu, "Limited Rotation Motor", *IBM Technical Disclosure Bulletin*, vol. 16, No. 7, Dec. 1973, pp. 2259–2260.
H. G. Dickie, et al., "Meter Movement Rotary Actuator", *IBM Technical Disclosure Bulletin*, vol. 22, No. 1, Jun. 1979, pp. 355–357.

*Primary Examiner*—Donovan F. Duggan
*Attorney, Agent, or Firm*—Henry E. Otto, Jr.

[57] ABSTRACT

An electric rotary actuator for producing rotation through a limited angle comprises a rotor winding made of a plurality of thin loop coils arranged in a continuous cylindrical framework as part of a rotor shell. The rotor shell lies in an annular flux gap defined by a stator magnet assembly and a flux return means. Each pair of adjacent axially extending limbs of adjacent loop coils lies opposite to and cooperates with a respective stator pole face. This winding arrangement helps to optimize the torsional resonance characteristics of the rotating mass.

4 Claims, 6 Drawing Figures

LIMITED ANGLE ELECTRIC ROTARY ACTUATOR

This is a continuation of application Ser. No. 192,785 filed Sept. 29, 1980 now abandoned.

TECHNICAL FIELD OF THE INVENTION

This invention relates to rotary actuators and in particular to actuators for producing rotation through a limited angle.

BACKGROUND ART

It is well known to employ rotary actuators for positioning magnetic heads of a magnetic disk file over selected information bearing tracks on the disks. The total angular range of movement necessary to move the heads across all the tracks is typically of the order of fifteen degrees. To minimize the time to access a given track, it is desirable that the actuator should have a high torque/inertia ratio. Because the movement has to be controlled with great precision by a servo system, it is also desirable that the actuator should have a very linear response to drive current, and that the structure should be free of resonant modes which could affect the stability of the servo system.

A state of the art rotary actuator for this application is described in UK Pat. No. 1,342,495, and in an article by J. S. Heath in the IBM Journal of Research and Development (July 1976, pages 389 to 397). This actuator is of the so-called swinging arm type which comprises a voice coil on one end of a pivotally mounted head/arm assembly. When energized, the voice coil moves, within a magnetic flux gap, in an arc to which its axis is always tangential, to cause rotation of the head/arm assembly about the pivot. This type of actuator does not provide balanced torque about the pivot, leading to reactions in the pivot bearings which can cause resonant vibration in the actuator body. These vibrations can produce misregistration between heads and tracks or cause undesirable resonances in the servo system. Nor is the torque/inertia ratio of the swinging arm actuator as high as it could be since part of the moving coil, at one extremity of the moving mass, is not active in producing torque. It is also difficult to provide effective magnetic shielding of the swinging arm actuator, which is important in magnetic information storage applications such as a disk file.

Torque balance can be achieved in a truly rotary actuator, more like a conventional electric motor, in which the rotor is coaxial with the axis of rotation of the head/arm assembly or other load.

One such rotary actuator is described in a publication "Limited Rotation Motor" by P. Y. Hu (IBM Technical Disclosure Bulletin, Volume 16, Number 7, December 1973, page 2259). This publication describes a way of converting various known types of d.c. motors to limited rotation devices, and shows one motor with a tubular printed circuit armature having longitudinal strip windings over the entire surface of a former. Power is supplied through flexible straps to fixed taps on the armature so that a fixed path of current flow is created. The path is such that the current interacts with a stator magnetic field to cause the limited rotation. Because of the need for a former, this type of motor does not maximize the current density in the flux gap. Furthermore, the rotor must be considerably longer than the magnetic flux gap length to accommodate the offsetting of the windings at the rotor ends. This increase in length will lower the torsional resonance frequency of the rotor.

Another rotary actuator is described in a publication "Meter Movement Rotary Actuator" by H. G. Dickie and A. R. Hearn (IBM Technical Disclosure Bulletin, Volume 22, Number 1, June 1979, page 355). This actuator resembles a rugged moving coil meter with a broadened coil. The actuator has a cylindrical shell rotor connected coaxially to a torque transmitting output shaft. The rotor wire is wound over the top and bottom of a hollow sided cylindrical former so that there is only wire and no former material in the working magnetic gap. For efficiency and to avoid out of plane forces, the wire must be wound as near to the axis as possible. This is difficult to achieve in practice and leads to a considerable build up of wire above and below the former. The torsional stiffness of the rotating portion of this actuator is not high because there is unsupported thin sheet of wire in the gap and because output torque is transmitted through a relatively thin output shaft. Thus the torsional resonance frequency may be lower than that which can be tolerated by a high performance servo system.

A rotary actuator for an entirely different application, is shown in UK Pat. No. 980,487. This patent shows a "torquer" and a "pickoff" for a gyroscope in which a cylindrical shell rotor has, deposited on a cylindrical former, two diametrically opposed square pancake coils, the axial limbs of which interact with the poles of an internal permanent magnet stator. The torquer restores a gyroscope containing drum to a predetermined orientation fixed by pickoff coils also on the rotor. The torsional rigidity of the torquer is almost entirely that of the former which by its presence in the gap reduces the motor efficiency.

DISCLOSURE OF THE INVENTION

According to the present invention, there is provided an electric rotary actuator for producing rotation through a limited angle, comprising a stator having a common cylindrical surface around which is a plurality of circumferentially disposed magnetic pole faces of alternate polarity; a flux return means for forming a magnetic circuit together with the stator which circuit includes a magnetic flux gap of annular cross section between the circumferentially disposed pole faces and the return means; and a nonmagnetic cylindrical shell rotor having an electrically conductive winding and being located in the flux gap coaxially therewith. The rotor winding comprises a plurality of loop coils, which are thin in comparison to their transverse dimensions, and which are arranged edgewise in a substantially continous cylindrical structure so that each pair of adjacent axially extending portions of adjacent coils lies opposite a respective one of the circumferentially disposed stator pole faces.

The novel rotor winding has several advantages, the primary one being its structural rigidity which reduces or removes the need for former material in the flux gap, permitting a smaller and thus more efficient gap to be employed. This form of winding also has the major advantage of increasing the torsional resonance frequency of the rotor. This is partly a consequence of the increased rigidity and party a consequence of the very efficient use of axial height resulting from the lattice-like winding structure. The winding structure has non-active portions which do not contribute to the motor torque taking up only a minimum proportion of the axial height of the winding. Because the active current element over any stator pole face comprises two contiguous limbs of adjacent loop coils, the width of each limb is only half what it would need to be if one coil alone provided the active current element. Consequently the non-active (i.e. circumferentially disposed) portions of the loop coils which add to the height of the winding are also halved in width and the height is thus further reduced.

A preferred feature of the loop coils is that they are of substantially rectangular form. This maximizes the above stated height advantage and also is magnetically most efficient since all of the active portions are axially disposed and thus orthogonal to both the gap field and the direction of motion. This also reduces the forces tending to distort the motor. It is further preferred that the coils should be contiguous, e.g. butted or overlapped to increase rigidity and minimize gap dimensions.

This type of rotor winding facilitates a substantially self supporting structure, and it is preferred that such a structure be employed so that the axial portions of the coils extend across the entire radial thickness of the rotor shell and are not supported in the gap by any backing former.

It is preferred that a cup shaped partial former should constitute one end of the rotor shell and be rigidly connected to the rotor windings. Such a former can advantageously include insert portions located within and conforming to the inner dimensions of the loop coils and flush therewith, thus further increasing torsional rigidity.

It is another preferred feature of the invention that, where such a former is employed, it is rigidly directly connected to a load support plate for supporting the load to be driven. This type of connection dispenses with the need for a torque transmitting shaft between rotor and load which would have a considerable effect on the overall torsional resonance frequency of the rotating mass. Such connection is facilitated by the winding structure which does not require the turns to be taken over the top and bottom surface of the cylinder.

A shaft and bearings for mounting the rotor is, however, desirable for centering purposes but is not employed to transmit torque.

The preferred overall arrangement of an actuator according to the invention comprises an external rotor and internal stator including a number of axially extending radially magnetized permanent magnet segments around a central magnetically permeable core. Such an arrangement is well shielded magnetically. An outer flux return path is provided by a cylindrical shroud which is preferably slotted between the magnets.

DETAILED DESCRIPTION

Figure 1:
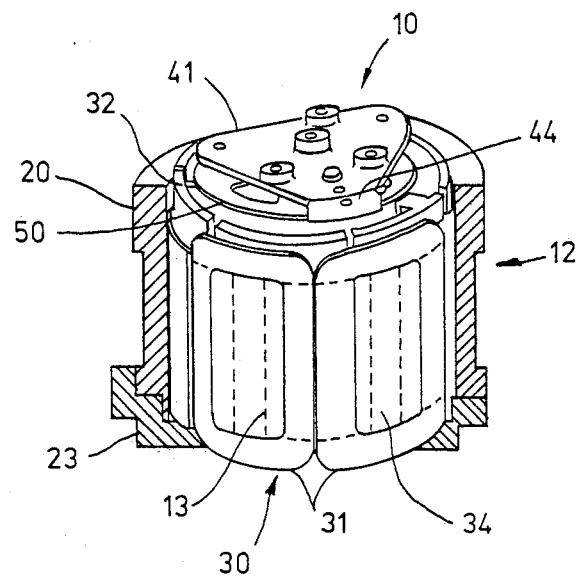
FIG. 1 is a partly cut away view of a rotary actuator, according to the present invention.
Figure 3:
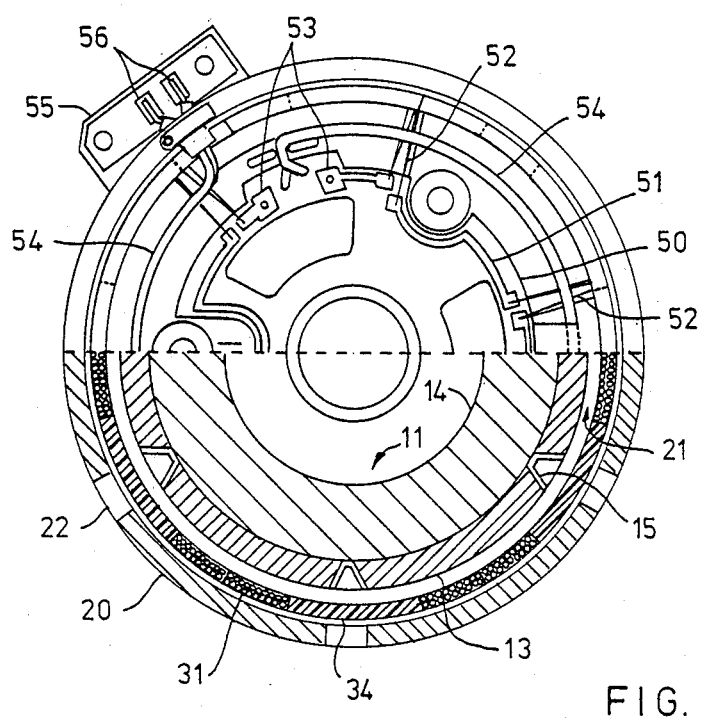
FIG. 3 shows in opposite halves horizontal sections through the motor of FIG. 1 at different levels.
Figure 2:
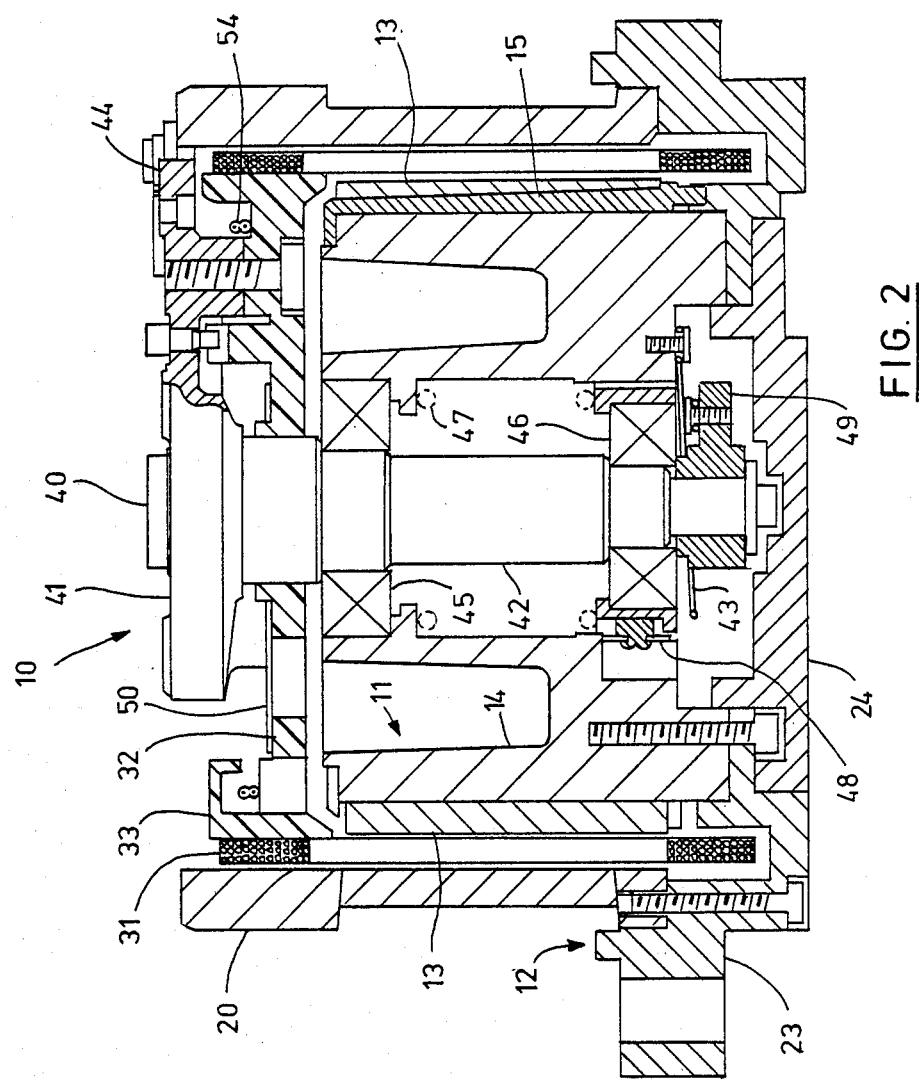
FIG. 2 is a vertical sectional view through the motor of FIG. 1.

The actuator illustrated in FIGS. 1, 2 and 3 comprises a rotor 10, a stator 11 and an external housing 12. The stator, as illustrated in FIG. 2 and the lower half of FIG. 3, comprises six permanent magnet segments 13 bonded to the external surface of a cylindrical soft iron magnetic core 14. The magnet segments are located on the core and spaced from each other by a separator cage 15 made of a nonmagnetic plastics material. The magnet segments 13 are radially magnetized with alternate polarity, the core 14 providing the inner return path for the magnetic flux.

The stator 11 is supported by the external housing 12, which includes a cylindrical shroud 20 of soft magnetic material surrounding the stator and defining an annular magnetic flux gap 21 therebetween. The shroud forms the outer return path for magnetic flux from the magnets and includes axial slots 22 to concentrate the flux directly over the magnets. These slots allow cooling air to pass through the motor, and the shroud provides good magnetic shielding for the actuator.

The shroud 20 is bolted, as is the core 14, to a mounting collar 23. A lock plate 24 is attached to the base of the mounting collar.

The rotor 10 of the motor has an armature winding 30, which comprises six loop coils 31 of substantially rectangular form arranged in a cylindrical lattice structure in the flux gap 21. Each loop coil is randomly wound from self bonding thermoplastic coated copper wire around a rectangular frame between side plates to form a rectangular pancake coil. The coil is formed of several turns of copper wire and is heat bonded together. The bonded coils are disposed around a cylindrical mandrel and heated to soften the thermoplastic after which they are bent to conform to the cylindrical surface required for the rotor. Six such coils are then assembled into a cylindrical lattice and edge bonded rigidly together with epoxy resin.

In this arrangement, the axial edges of adjacent coils are butted together and, after bonding, the coils form a substantially self supporting structure. Each contiguous pair of axial limbs of adjacent coils faces one of the magnet segments 13. In operation, current flows in the same direction in the adjacent limbs. The magnets are broader circumferentially than the pair of limbs of the adjacent coils so that during movement of the rotor within its permitted angular range, each pair of limbs always overlies its respective bar magnet. This improves the linearity of response of the motor since the limbs never extend into the fringing field at the vertical edges of the magnets.

Because of the self supporting nature of the winding 30, no backing support for the working portion of coils 31 need be provided. The magnetic flux gap 21 needs only to be sufficiently wide to accommodate the radial thickness of the winding plus sufficient clearance for free rotation thus permitting the greatest possible flux density to be achieved.

A major advantage of the cylindrical lattice winding is that it reduces the axial height of the rotor. If the pair of limbs of adjacent coils were a single limb of a single coil, that coil would be as wide at the top and bottom as the pair of limbs in the described arrangement. Thus the axial height would be increased. Alternative winding techniques employing a return path over the top and bottom of a cylindrical rotor would also tend to build up the overall height.

A further advantage of the lattice structure is the increased structural rigidity resulting from the continuous frame of coil metal around the cylindrical surface. Both the height reduction and the increased rigidity contribute to an increase of torsional resonance frequency which is important for servo system stability.

The rotor includes a partial former 32 to give additional rigidity to the structure and to provide a means for transmitting the torque produced to a load. The former comprises an end cap whose rim 33 is bonded to the upper horizontal nonactive portions of loop coils 31. Inserts 34 depend from the rim 33 and occupy the space within the center of loop coils 31 to give increased torsional rigidity to the rotor shell.

At its center, former 32 is located on the uppermost rounded portion of a spindle 40. The spindle 40 includes a roughly triangular load platform 41 cast integrally therewith. The former 32 is bolted to the load platform at three points to provide a rigid, torque transmitting connection. This type of mechanical connection is facilitated by the winding 30 being confined to the cylindrical surface of the rotor. With such a connection the spindle shaft portion 42 provides a centering function and does not transmit any torque. This further increases the torsional resonance frequency of the overall rotating mass, including the load, over that which could be achieved if torque were transmitted through a shaft. The load platform 41 supports a load, such as the head/arm assembly of a magnetic disk file, which can be located on the platform by locating pins and bolted to it at several points. For optimum performance, the entire rotating mass including the load should be dynamically balanced. Another feature of the load platform in a projection 44 which moves between two limit stops (not shown) to restrict movement to the predetermined angular range.

The spindle shaft 42 is mounted for rotation in bearings 45 and 46. The upper bearing 45 is fixed in place in core 14 while the lower bearing 46 is floating. Axial preload of bearing 46 is provided by coil spring 47 and radial preload by a bowed leaf spring 48. Thus the whole rotor assembly 10 is mounted for rotation on spindle shaft portion 42 and transmits torque to a load by way of spindle load platform 41.

A spindle retract spring 43 consisting of a single helical turn is bolted at one end to the core 14 and at the other to an extension arm 49 which is fixed to the spindle and rotates therewith. When the motor is not energized, the retract spring 43 urges the spindle and hence the whole rotor to one extreme of its permitted range of movement as limited by the projection 44 and limit stops. The retract spring 43 also provides a conductive path to ground the spindle 40 electrically.

With particular reference to FIG. 2 and to the upper half of FIG. 3, the basic element of the electrical connection of the winding 30 is a disk shaped connector card 50 having a pattern of printed circuit type conductors 51 thereon. The card 50 is supported by and rotates with former 32. Each conductor 51 electrically connects a pair of adjacent coils by way of coil termination wires 52 so that all six coils 31 are connected in series. The printed circuit conductors terminate electrically in printed terminals 53. To each of these terminals 53 is soldered one wire of a two core flexible cable 54 that forms an almost complete helical loop about the connector card 50 and is loosely supported by former 32, which includes channel guide portions for this purpose. The flexible cable is supported slightly above the plane of the connector card but is carried down through the card between terminals 53 and its split wires brought up again through the card to the centers of terminals 53 for soldering.

At its other end, the flexible cable is clamped for strain relief on the upper edge of shroud 20 and led down a channel in the side of the shroud to terminate in a connector block 55 fixedly mounted on collar 23. External electrical connection is made to the actuator through terminals 56 on block 55.

As the rotor 10 rotates carrying the connector card 50 with it, the flexible cable 54 coils and uncoils slightly to permit free movement within the predetermined angular limits of motion.

Figure 4:
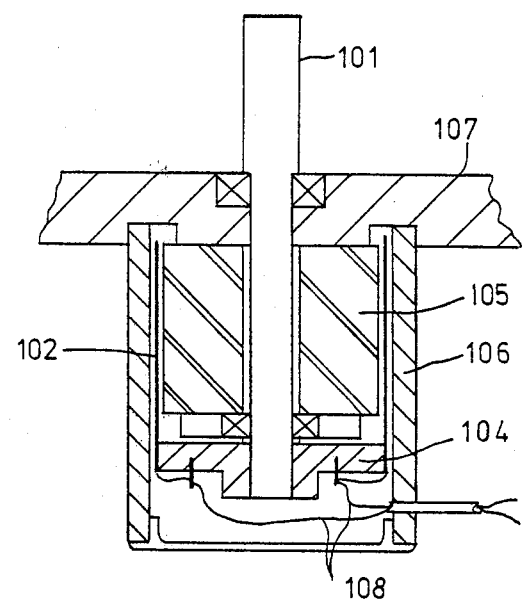
FIG. 4 is a sectional view taken through another embodiment of a motor, according to the present invention.
Figures 5, 6:
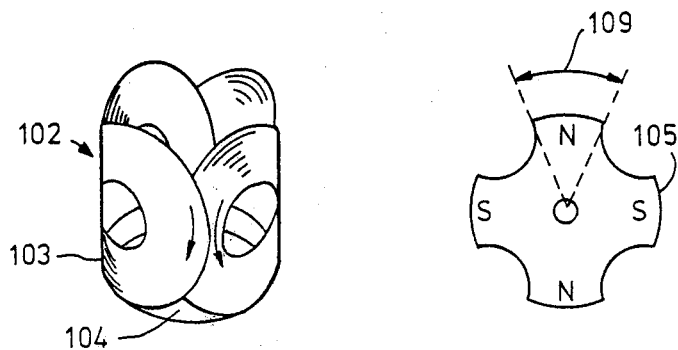
FIG. 5 shows the rotor winding employed in the motor of FIG. 4.
FIG. 6 shows the stator employed in the motor of FIG. 4.

With reference to FIGS. 4 to 6, there is shown a further embodiment of a rotary actuator according to the invention. This actuator employs the same basic winding principle as that of FIGS. 1 to 3 but is of less rugged construction. It is suitable for applications where the load inertia and accelerations required are lower.

As shown in FIG. 4, the actuator rotates an output shaft 101 by movement of an ironless rotor 102 of special construction.

FIG. 5 shows the principle of construction of rotor 102 from four or more flat circular pancake coils 103. During assembly, these coils are wound and loosely bonded to permit handling when removed from a winding mandrel. They are then formed around a cylindrical mandrel with adjacent edges overlapping, and rigidly bonded together with an end support cap 104. This cap is rigidly attached to the actuator shaft 101, as shown in the assembled actuator of FIG. 4.

The magnetic circuit of the actuator comprises a four pole permanent magnet stator 105 (shown separately in FIG. 6) and a flux return path including a cylindrical steel shroud 106. The stator 105 and shroud 106 are mounted on a complementary portion 107 of the machine casing in which the actuator is employed. Flexible leads 108 provide electrical connection to the pancake coils to allow rotation within the limited angular range indicated by the arrow 109 of FIG. 6. The coils are connected in series with alternate directions of current flow so that, at the four areas of overlap of the coil, the currents are additive, as indicated by the arrows in FIG. 5.

The actuator of FIGS. 4 to 6, like that of FIGS. 1 to 3, has a high torque/inertial ratio and a linear response over the limited range of movement indicated by arrow 109. Like the actuator of FIGS. 1 to 3, that of FIGS. 4 to 6 has advantages of compactness and high torsional resonance.

It will be realized that although a specific application to disk file head positioning has been described, rotary actuators according to the invention may be employed for other purposes. The two actuators described in FIGS. 1 to 6 may also be modified in a number of ways without departing from the principles of the invention. For example, the number of poles may be any even number and need not be four or six. The stator magnets need not be permanent but could be electromagnets. The coil windings for either motor could be a single thickness of rectangular or trapezoidal section wire wound in a spiral. This could increase the current density in the gap but must be balanced against increased inertia. The wire material need not be copper but could be any suitable conductor such as aluminum. Rather than producing a separate former and bonding it to the coil lattice, the former could be injection molded around the coil so as to encapsulate it.

Furthermore, although magnetically shielded external rotor/internal stator actuators have been described, the cylindrical lattice winding of the invention could be applied to an external stator/internal rotor actuator where magnetic shielding was not important.

What is claimed is:

1. An electric rotary actuator for producing rotation through a limited angle to position magnetic heads of a magnetic disk file over selected information-bearing tracks on a disk, said actuator comprising:
   a stator (11) comprising a hollow magnetically permeable core (14),
   a plurality of axially extending, radially magnetized permanent magnets (13) circumferentially mounted around said core and separated by axially extending magnetic flux gaps (15) of uniform width, the outer cylindrical surface of said magnets constituting a plurality of circumferentially displaced magnetic pole faces of alternate polarity;
   an annular flux return means (20) surrounding said magnets and spaced therefrom to provide an annular magnetic flux gap (21), said flux return means having a plurality of axially extending slots (22), each circumferentially aligned with a respective one of said axially extending flux gaps; and
   a non-magnetic rotor concentrically disposed in the annular flux gap (21) and comprising a winding (30) including a plurality of substantially rectangular loop coils (31) that are curved out-of-plane and arranged edgewise in a substantially continuous cylindrical structure so that, throughout rotation within the limited angle, each pair of adjacent axially extending portions of adjacent coils (31) will be substantially opposite a respective one of the circumferentially displaced pole faces.

2. An actuator as claimed in claim 1, wherein each portion of the flux return means between adjacent slots (22) is angularly coextensive with a respective one of said permanent magnets (13).

3. An actuator as claimed in claim 1, in which the number of loop coils (31) in the rotor is six and the number of permanent magnets in the stator is six.

4. An actuator as claimed in claim 1, comprising:
   a partial former end cap (32,33) to which non-active coil portions at one end of the rotor winding (30) are joined; and
   a load support platform (41) for supporting the load to be driven and juxtaposed with and directly connected to the end cap (32,33) and independently supported for rotation by a spindle (40), rotatably mounted in bearings (45,46) within said core.

* * * * *